US009852726B2

(12) United States Patent
Singaraju

(10) Patent No.: US 9,852,726 B2
(45) Date of Patent: Dec. 26, 2017

(54) BACKGROUND NOISE REDUCTION IN AN AUDIO DEVICE

(71) Applicant: Motorola Mobility LLC, Chicago, IL (US)

(72) Inventor: Snehitha Singaraju, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/056,921

(22) Filed: May 11, 2016

(65) Prior Publication Data

US 2017/0330548 A1 Nov. 16, 2017

(51) Int. Cl.
*H04B 15/00* (2006.01)
*G10K 11/178* (2006.01)

(52) U.S. Cl.
CPC .... *G10K 11/178* (2013.01); *G10K 2210/1081* (2013.01); *G10K 2210/3046* (2013.01); *G10K 2210/3056* (2013.01)

(58) Field of Classification Search
CPC .................................................... G10K 11/178
See application file for complete search history.

(56) References Cited

U.S. PATENT DOCUMENTS

2010/0260345 A1* 10/2010 Shridhar .............. G10K 11/178 381/71.1
2012/0148060 A1* 6/2012 Isberg ................ G10K 11/1788 381/71.1
2013/0287219 A1* 10/2013 Hendrix ............... G10K 11/175 381/71.6
2014/0169579 A1* 6/2014 Azmi ..................... G10K 11/16 381/71.6
2015/0104031 A1* 4/2015 Park ................... G10K 11/1788 381/71.6
2016/0125866 A1* 5/2016 Park ..................... G10K 11/178 381/71.11

OTHER PUBLICATIONS

Derya Dalga and Simon Doclo, "Integrated Active Noise Control and Noise Reduction Schemes in Open-Fitting Hearing Aids", http://www.uni-oldenburg.de/fileadmin/user_upload/mediphysik/ag/sigproc/download/papers/SP2011_3. pdf, 2011, pp. 367-368.

* cited by examiner

*Primary Examiner* — Simon King
(74) *Attorney, Agent, or Firm* — Kunzler PC

(57) ABSTRACT

A method and apparatus are for determining one or more background noise characteristics, determining one or more incoming audio characteristics; and generating a combined audio signal comprising an active noise cancellation (ANC) component and a modified incoming audio (MIA) component. The ANC component is determined based on at least one of the one or more incoming audio characteristics and the background noise characteristics. Each of a limit of the ANC component and a limit of the MIA component is dynamically controlled to be less than or equal to a system limit, wherein a limit of the combined signal is approximately at the system limit.

14 Claims, 11 Drawing Sheets

1500

BACKGROUND NOISE REDUCTION IN AN AUDIO DEVICE

FIELD OF THE INVENTION

The present invention relates generally to background noise reduction in an electronic device that generates audio from a speaker that is intended for at least one human ear, and more specifically to dynamic background noise reduction in such an electronic device.

BACKGROUND

Active noise control has been used for many years to reduce the perceived background noise conditions. Acoustical superposition of the background noise and a generated anti-noise signal which is of equal amplitude and opposite phase as the background noise signal results in a null. For example, active noise control has been quite successful in improving the audio experience in headphones that have been sold for use during air travel. Techniques used for these devices have been adapted for use in other electronic devices, including mobile and vehicular radio telephonic devices such as public safety radios and cellular telephones. Active noise control generally requires a reference sensor, an error sensor, computing resources to determine the amount and characteristics of background noise and transducer(s) to output the acoustic anti-noise signal generated. In devices where a separate playback audio signal is present, these resources might be shared. In current active noise control systems, an active noise cancellation (ANC) component and a modified incoming audio (MIA) component are generated. The ANC component and the MIA component are determined independently of each other and are summed together at fixed pre-determined levels that guarantee meeting a system limit that may be determined by one or more of, for example, a digital full scale limit, a rated voltage or rated power of components in the system, pass system requirements such as clipping and distortion metrics, or a user volume setting. In these independent fixed summing systems, the ANC component is determined based on characteristics of the background noise and the MIA component is determined based on the characteristics of the incoming audio source and/or background noise characteristics. The two components are then summed together such that the combined signal will remain within the system limit. In these independent fixed summing systems, the ANC component is sometimes at a low level, and the summed signal does not include the MIA component that is maximized within the system limit. In some embodiments, the MIA component is further constrained by limits imposed on how much gain can be used for the incoming audio.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The description is meant to be taken in conjunction with the accompanying drawings in which:

Figure 1:
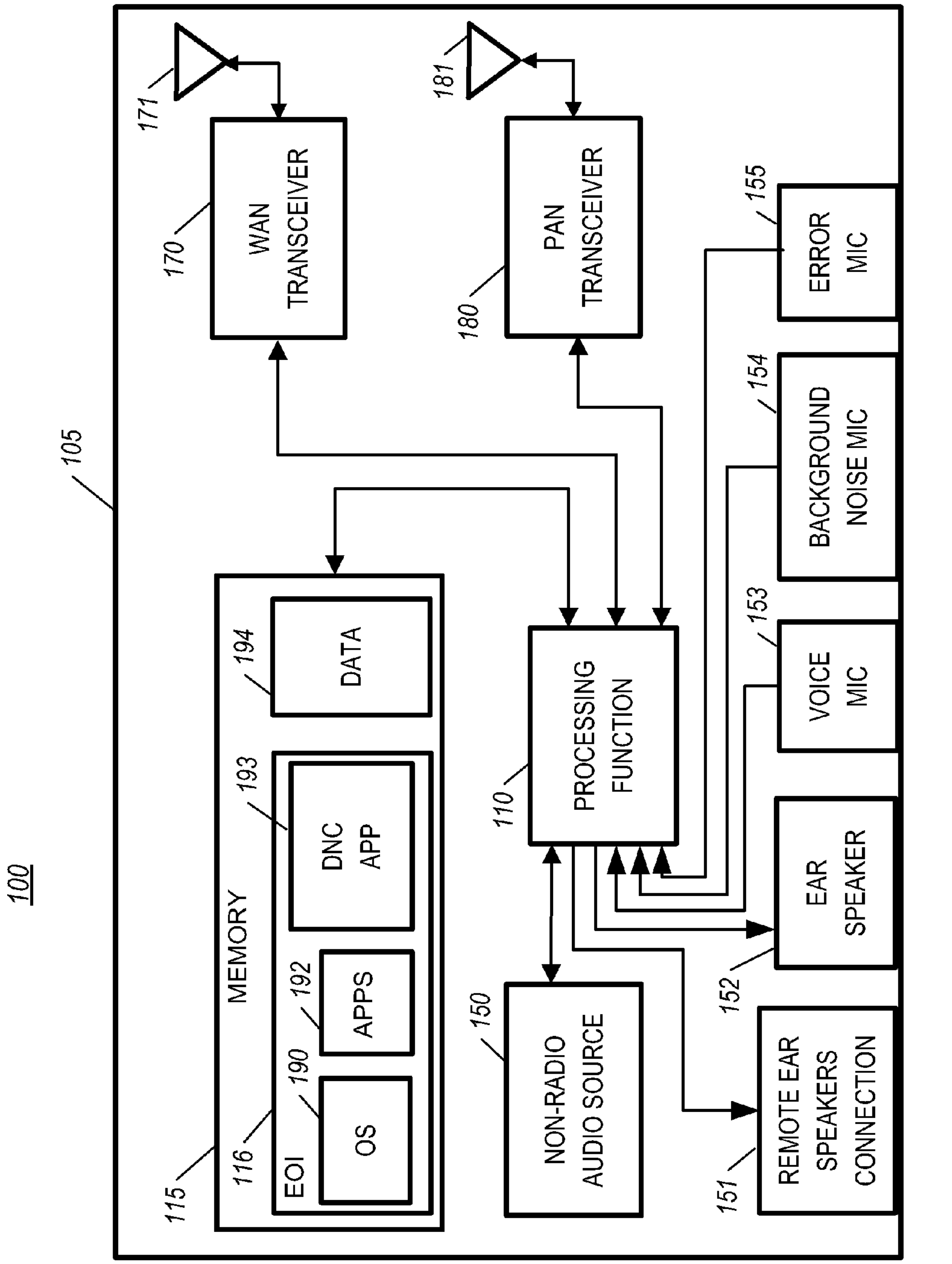
FIG. 1 is a hardware block diagram that shows an electronic audio device, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to active noise control in electronic audio devices (EADs) that are equipped with at least one background noise sensor such as a microphone, at least one error sensor such as a microphone and in which a generated anti-noise signal or the active noise cancellation (ANC) signal is combined with a modified incoming audio (MIA) signal to generate a combined audio signal that drives at least one speaker. In these embodiments, one or more characteristics of the background noise sensed by the background noise microphone are used to determine the modified MIA component and/or at least one or more characteristics of the incoming audio are used to determine the ANC component that will be used to generate the combined signal. This provides improvement compared to noise cancellation systems in which the ANC component and the MIA component are determined independent of each other and are summed together at fixed pre-determined levels to meet a system limit. The embodiments described herein provide a method and apparatus based on determining background noise characteristics and incoming audio characteristics that are used to dynamically determine the ANC and MIA components and adjusting summing allocations between the ANC and MIA components for maximizing the perceived audio quality of the combined audio signal, which typically provides an audio signal at the system limit.

Referring to FIG. 1, a hardware block diagram 100 shows an electronic audio device (EAD) 105, in accordance with certain embodiments. The EAD 105 comprises a processing function 110, a memory 115, input/output interface circuitry 120, at least one audio source, at least one background noise microphone 154, at least one error microphone 155, and at least one speaker 152. Audio sources may comprise, for example, a wide area network (WAN) transceiver 170, a personal area network transceiver 180, and/or a non-radio audio source 150. The EAD 105 may include a voice microphone 153, which is typical for EADs that provide telephony, but may also exist in some non-radio EADs, such as gaming devices that provide voice communications over internet protocol. The EAD 105 may include a remote ear speaker wired or wireless (e.g., Bluetooth) connection 151 that can alternatively drive in some embodiments one or two ear speakers (not shown in FIG. 1) of a headset. Speaker 152 may represent one speaker of a headset. The connection 151 in some embodiments may alternatively drive more than two speakers. This may be done in embodiments in which the speakers are farther away than headphone speakers, in which multiple speakers may be used to focus audio to one or more target listeners The processing function 110 comprises one or more processing devices (not shown in FIG. 1), each of which may include such sub-functions as central processing units (cores), cache memory, instruction decoders, just to name a few. The processing function 110 executes program instructions which may be located within memory in the processing devices or may be located in a memory 115 external to the processing function 110, to which the memory 115 is bi-directionally coupled, or in a combination of both.

In some embodiments, the EAD 105 may include one or more radio devices, such as a wide area transceiver 170, a personal area network transceiver 180, and/or others (not shown) such as, for example, a local area network transceiver. Each of the radio devices is equipped with at least one antenna, which for the WAN transceiver 170 is antenna 171, and for the PAN transceiver 180 is antenna 181. These antennas may be internal or external. Other radio device types that the EAD 105 may include are local area transceiver and mesh transceivers. The processing function 110 in these embodiments is further coupled to the transceivers 170, 180 and others that are included in the EAD 105. The wide area network transceiver or transceivers may be for cellular, enterprise, public safety, or other wide area systems. Local or personal area network or mesh network transceivers may be for W-Fi®, Bluetooth®, Zigbee®, or other local area networks, personal area networks, or local mesh networks. Each radio transceiver may be a source of receive audio. The electronic device 105 has a power source (not shown in FIG. 1) that may be a rechargeable battery or a power main. In some embodiments one or more of the radio transceivers themselves comprise one or more processors and memory, and may also comprise circuits that are unique to radio protocols defined by an industry standard. Some embodiments may have a Wi-Fi® transceiver but no cellular transceiver, such as some devices commonly referred to as pads or tablets. Other examples of the EAD 105 include smart watches and fitness monitors. Some EADs may include no radio transceivers, such as some music players (e.g., players of DVD, CD, tape or memory stick media), in which case the non-radio audio source is, for example, a media that stores the audio or a signal carrying audio, such as an audio cable. Other non-radio transceiver sources include TV's, iPods, and gaming stations.

The background noise microphone 154 is designed and positioned to optimize the reception of background noise while minimizing the reception of audio emanating from the at least one speaker 152. Background noise may include all audio received by the background noise microphone 154, even though the received audio includes audio that may not be normally considered background noise, such as speech or music directed at the user of the EAD 105. The error microphone 155 is designed and positioned to best sense the audio signal heard by the user, i.e., the signal that has been generated by combining an active noise cancellation (ANC) component with a component that includes modified audio from the one or more audio sources. The error microphone 155 is typically near the user ear. The error microphone 155 may be omitted in some systems in which the user does not use a headset or have an EAD 105 near the ear.

The hardware block diagram 100 (FIG. 1) shows the executable operating instructions (EOI) 116 being stored in the memory 115, external to the processing function 110, but as noted above, the memory 115 may be within or shared with the one or more processing devices. The memory 115 also stores data 194. The EOI 116 of the electronic device 105 includes groups of instructions identified as an operating system (OS) 190, software applications 192 (including software utilities), and a software application called the dynamic noise cancelling (DNC) application 193. The applications 192 may include conventional human interface applications such as game applications, navigation application, video processing applications, and sensor processing applications. The DNC 193 implements and controls many of the functions described below. The combination of the processing function 110, the EOI 116, and the data 194 may also be referred to as the processing system of the electronic device 105. The processing function 110 is coupled to the at least one speaker 152, the at least one background noise microphone 154, the at least one error microphone 155, and at least one audio source 150, 170, 180. It will be appreciated that the processing system and/or each of the audio devices to which the processing system is coupled may include circuitry for adapting the digital input/outputs used within the processing system to the analog input/output signals needed for analog audio. The EAD 105 may include other I/O devices (e.g., displays, indicators, keys, serial data connectors, etc.) and physical sensors (GPS, gravity, temperature, battery capacity, etc.) to which the processing system is coupled. Some examples of the EAD 105 are a two-way radio (such as a cellular telephone, a public safety radio, or a walkie-talkie), a personal music player (e.g., an iPod®, trademark registered to Apple® Corp.) with a headset, an independent game console with a headset (such as Nintendo® 3DS), and a TV game console (such as a Nintendo® Wi) which incorporate the features described herein.

Figure 2:
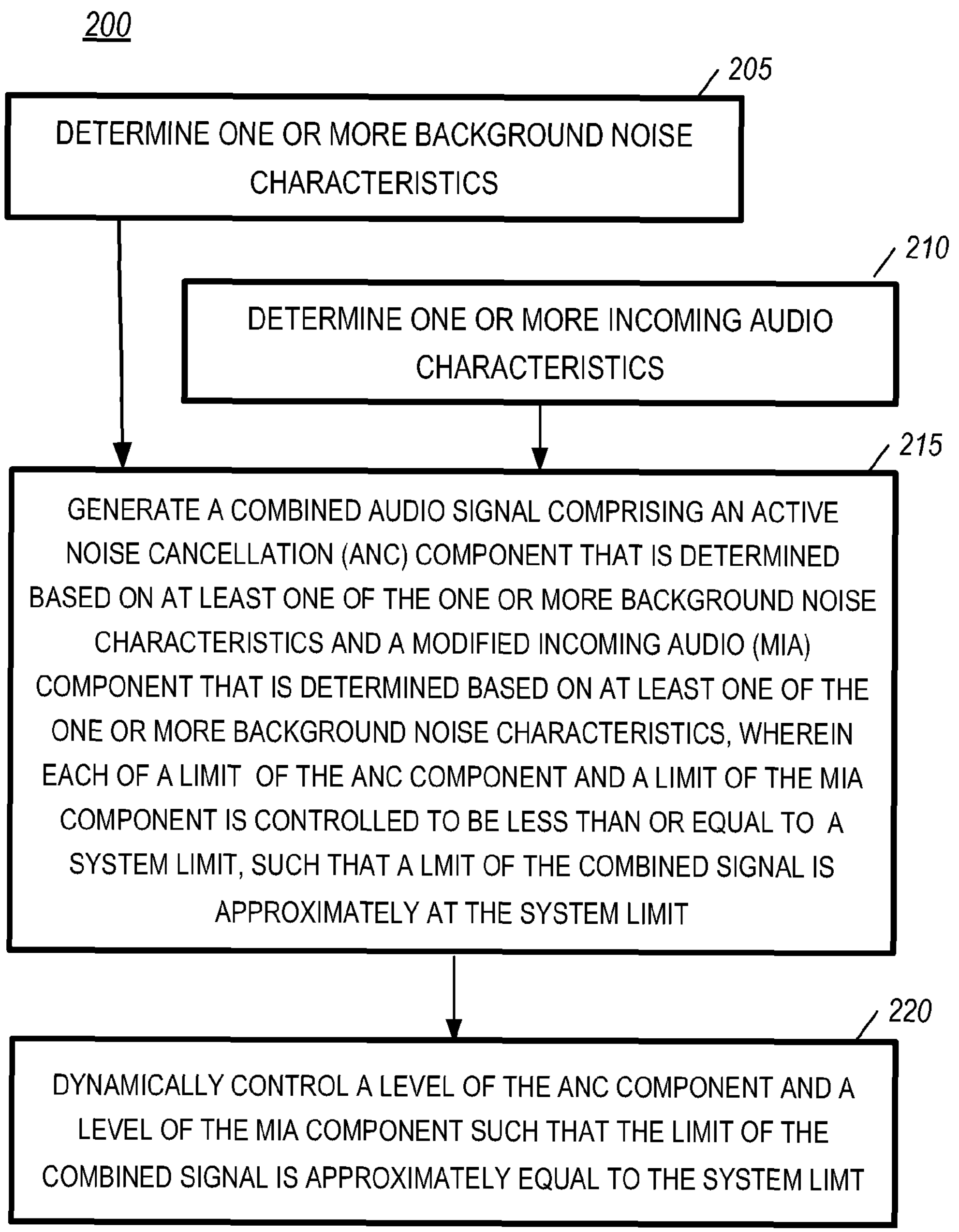
FIG. 2 is a flow chart that shows some steps of a method for background noise reduction, in accordance with some embodiments.

Referring to FIG. 2, a flow chart 200 shows some steps of a method for background noise reduction, in accordance with some embodiments. At step 205, background noise characteristics are determined for a given time period or a time frame, also referred to as an analysis window. At step 210, incoming audio characteristics are determined during the analysis window. At step 215, a combined audio signal is generated based on at least the characteristics determined in steps 205-210, and in some embodiments, based on results from previous analysis windows. The combined audio signal comprises an active noise cancellation (ANC) component, which is an audio signal, and a modified incoming audio (MIA) component, which is an audio signal. Performing the steps 205-215 for at least one or more of the analysis windows makes this method a dynamic background noise reduction method. The ANC component is determined based on at least one of the one or more background noise characteristics. An initial version of the ANC component is obtained by generating a noise cancellation signal based on the background noise using standard techniques. Thereafter, the ANC component is generated dynamically, based on ongoing assessment of one or more of background noise characteristics and past values of the ANC component, as described in further detail below. The incoming audio may be spectrally filtered to generate an initial MIA component, with the filtering parameters being dependent on an acoustic application, and in some cases, the type of incoming audio (e.g., voice, music, etc.). Thereafter, the MIA component is generated dynamically, based on ongoing assessment of the incoming audio and one or more of the background noise characteristics, the ANC component, and past values of the ANC component, as described in further detail below. Other acoustic modifications may also be imposed. An acoustic application may be defined for, example, by a combination of audio hardware characteristics and spatial arrangements, such as a specific cellular telephone and different positions of the telephone with reference to a user's ear. A limit of the ANC component and a limit of the MIA component are each dynamically controlled to be, during current and/or successive analysis windows, equal to or less than a system limit, while also maintaining a limit of the combined audio signal that is less than or equal to a system limit. In some embodiments, the limit of the combined audio signal is maintained approximately at the system limit. The levels of the ANC and MIA components are also dynamically controlled to be within the respective limits of the ANC and MIA components during current and/or successive analysis windows. (In some embodiments, most analysis windows are used but some analysis windows may be skipped, e.g. due to resource limitations, without substantial loss of benefits.) Step 220 is an optional step used in some embodiments. At step 220, a level of the ANC component and a level of the MIA component are each dynamically controlled such that a limit of the combined signal is approximately equal to the system limit. The analysis windows may range from 1 millisecond to 1 second. Controlling these limits and levels may performed based not only on a current analysis window, but on previous analysis windows. These steps may be implemented by the DNC application 193. The background noise characteristics may be determined from audio that is received by the background noise microphone 154 (FIG. 1) of an electronic device. The incoming audio may be from a radio transceiver, such as the LAN transceiver 170, the PAN transceiver 180, or a non-radio audio source 150 of an electronic device. "Limit" means the maximum value a signal is allowed to reach at any given instance. For example, a peak voltage limit for the combined audio signal means the maximum allowed peak voltage of the combined audio signal. The phrase "such that a limit of the combined audio signal that is approximately at the system limit" means that the limit on the ANC component and the limit on the MIA component are each dynamically varied to be less than or equal to the defined system limit, while the limit of the combined audio signal is maintained at a limit approximately the system limit. "Approximately" in this context, for some embodiments, means within 10% of the intended value. Approximately may be less in some embodiments, e.g., 2% or 5%. This variation accounts for calculation tolerances and hardware tolerances. The system limit is typically a voltage, power or an energy limit that an application cannot exceed. For some applications, the system limit may have a spectral shape and peak, determined by the acoustic application and the use. This spectral shape may have average and/or peak levels much lower than hardware limits of the EAD 105, such as 50% or 66% of such hardware limits.

Reference has been and will be made in this document to signal levels and a system limit. Signal levels may be characterized by amplitudes (such as peak amplitudes, or root mean square amplitudes of voltage or power etc.), or energy values. Limit is the maximum value a signal level can reach. The system limit may involve combinations of the maximum signal levels or limits, none of which may be exceeded. The system limit may, in some embodiments, be simply one specific limit, such as a peak voltage level. System limits may include values determined, for example, by hardware component limitations (e.g., voltage, current, power), digital value limitations, quality settings (e.g., distortion), or user selections (e.g., a volume setting). For example, an audio signal may have a signal limit on peak amplitude equal to the system limit which in turn is set to be equal to the rub and buzz voltage rating of the loudspeaker that the combined audio signal will be played through. The system limit may include a frequency response requirement of the system. Controlling a signal limit means changing the maximum value the signal can reach, up to the system limit. The signal levels and specific limits may be described in analog values or digital values. Digital values may be expressed with reference to 0 dBFS as a maximum value in a particular EAD 105. The ANC upper limit is defined as a maximum value that the ANC component can reach at any given instance. The ANC upper limit can be at or below the system limit in some embodiments. Setting a ANC upper limit below the system limit prevents the MIA component from being controlled to a zero level in cases of high background noise.

In some embodiments, background noise error characteristics are also determined. The error noise characteristics may be determined from audio received at the error microphone 155 (FIG. 1) of an electronic device. In these embodiments, the ANC component is generated at least based upon the background noise characteristics, the background noise error characteristics, and the incoming audio characteristics. Active noise control techniques for generating an anti-noise signal, also called the active noise cancellation (ANC) component, using signals from both a background noise sensor and an error sensor and based on either feedback or feedforward or a combination of both methodologies are well known and will not be covered herein, Referring to FIG. 3, a flow chart 300 shows some additional steps of the method for background noise reduction, in accordance with some embodiments. The background noise is the audio received by the background noise sensor, e.g., microphone 154. The step of determining background noise characteristics 205 (FIG. 2) may include one or more of the following steps. At step 310 the background noise may be classified as a quiet noise 311 in response to a relative or an absolute level of the background noise being less than a defined quiet threshold. In response to the background noise level being greater than a high noise threshold at step 315, the background noise is classified as high noise 317. At step 315 the background noise may be classified as a moderate noise 316 in response to the noise level being between the quiet threshold and the high noise threshold. For example, high noise may occur in an environment such as a crowded bar or cafeteria, airplane engine noise, diesel truck at 10 meters. Examples of environments in which moderate noises occur are a busy office, TV in the background in a room (set at home level, measured at 1 meter), a vacuum cleaner at 3 meters, etc. Examples of environments in which quiet noise occur are a library, a normal conversation at 1 meter, bedrooms at night etc. At step 320 the background noise may be classified as voice 321 or non-voice 322 by a voice activity detector (VAD). It will be appreciated that three background noise ranges are defined for the embodiment described with reference to FIG. 3. Some embodiments may have two ranges or more ranges.

At step 325, the stationarity of the background noise may be classified as one of non-stationary noise 326 and stationary noise 327 in response to frequency, temporal, and amplitude measurements of the background noise related to the way the background noise changes over time, during a defined time interval. The defined time interval may vary depending upon application. A short term interval may be 10 milliseconds or more, a long term interval can be as high as 5 seconds. The defined time interval may be a moving time window. Examples of noise sources that are typically stationary are HVAC (heating, ventilating, and air conditioning) equipment, machine engines, and motors; their frequency and temporal characteristics are relatively constant over a defined time interval. Noise sources that have time varying frequency/spectral characteristics during the defined time interval are non-stationary, such as speech audio, babble noises in a cafeteria, music, etc. The amplitude, frequency and spectral characteristics of non-stationary noise are continuously changing over time. These changes can be due to the randomness of the noise sources, such as the crowd noises at a sporting event. Any of these, or other noise sources, may be a part of the background noise captured by the background noise sensor 154, depending on the environment in which the EAD 105. The stationarity of the background noise (and other background noise and audio characteristics) can be determined based on an analysis of audio data from the background noise sensor, the error sensor, or a combination of both. The analysis can be based upon a short term (e.g., one 10 millisecond frame) interval or a long term interval (e.g., multiple 10 millisecond frames) estimate of a non-voice portion 322 of the background noise determined at step 320. These classifications as to background noise level (steps 310-315) and the stationarity of the background noise (step 325) may be used to optimize the perceived audio quality as described more fully herein below. At step 330, a background noise spectrum characterization (e.g., amplitudes of one, two or more predominate frequencies, or an amplitude/frequency plot over a range of frequencies, or other concise spectral characterization) 331 is determined from the background noise when the background noise is determined to be stationary at step 325.

In some embodiments, certain steps described with reference to FIG. 3 may not be needed to make the background noise spectrum characterization. For example, a particular embodiment of an EAD 105 may be intended only for use with a particular noise source (also referred to as the noise type). An example of such a device is a set of headphones intended for use in airplanes. In this case, steps 310, 315, 320, 325, and 330 may all be omitted and fixed values used for the noise level and bandwidth characterization. In some cases, steps 310 and 315 may be used occasionally to re-valuate the background noise level and steps 320, 325, 330 are not needed. Some embodiments of an EAD 105 may have user selectable noise types. In some embodiments, all the steps may be used to detect one of a set of defined noise types. The noise type has an associated noise spectrum and noise level. These together form a noise profile. For example the background noise observed in a car is dominant under 125 Hz, while the background noise from a hair dryer tends to be dominant for frequencies over 500 Hz. Similarly, many HVAC background noises can be identified to have a predominant noise source at 63 Hz, and an engine or a motor noise can be identified as something unique and periodic. When an embodiment of the EAD 105 does not have an established set of noise types, then steps 310-330 may be used to determine stationarity and characteristics of the background noise. Noises in restaurants, airports, train stations, babble noise are typically determined at step 325 to be non-stationary and typically have unidentifiable dominant frequencies. The ANC component is based on a spectrum of the non-stationary noise but has a bandwidth that is not necessarily equal to the bandwidth of the background noise.

Figure 4:
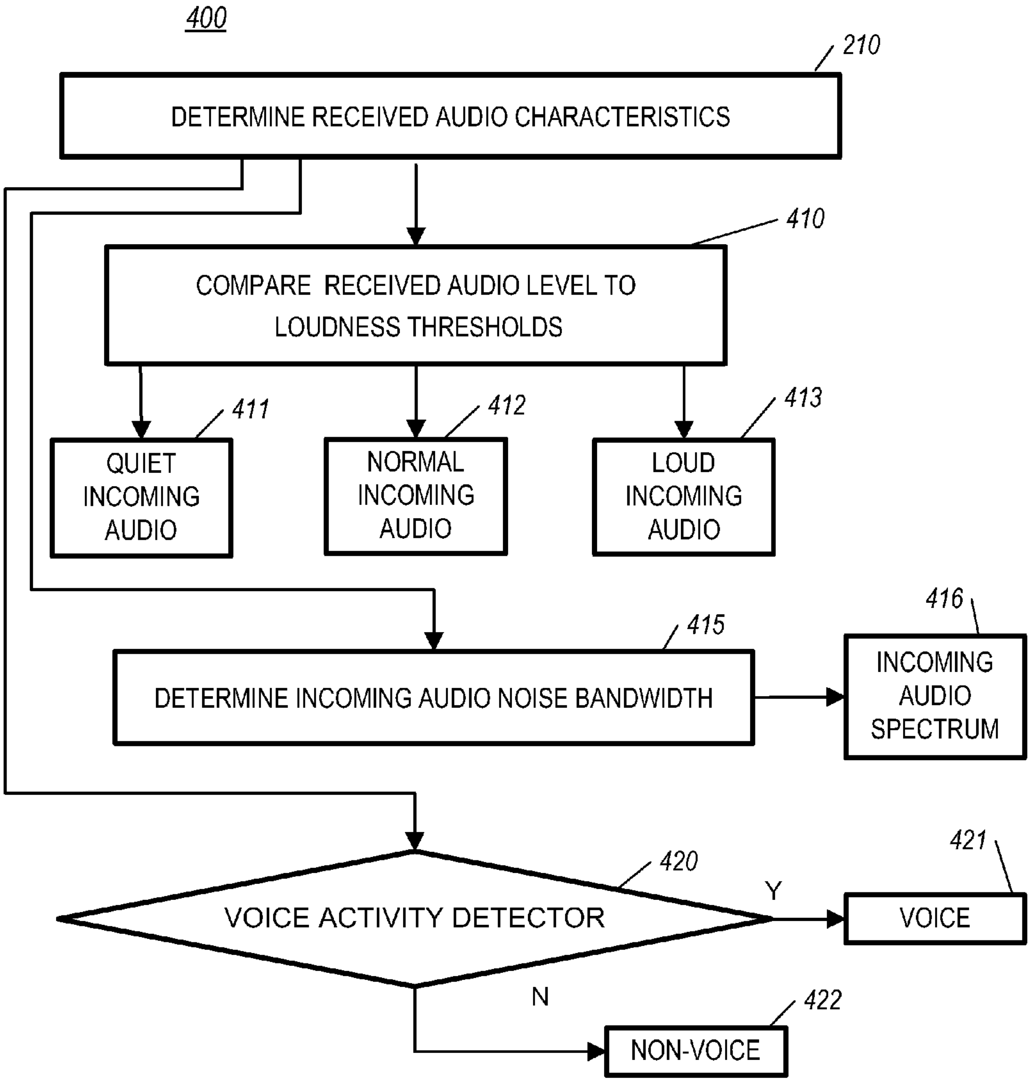
FIG. 4 is a flow chart that shows some additional steps of the method for background noise reduction related to incoming noise characteristics described with reference to FIG. 2, in accordance with some embodiments.

Referring to FIG. 4, a flow chart 400 shows some additional steps of the method for background noise reduction, in accordance with some embodiments. The step of determining incoming audio characteristics 210 (FIG. 2) may include the following steps. At step 410 the level of the incoming audio is determined. In some embodiments, the level is compared to a first threshold and a second threshold and classified as quiet incoming audio 411, normal incoming audio 412, and loud incoming audio 413 in response to the level of the incoming audio being compared to the first and second thresholds. For example, an audio signal with an average RMS energy above −12 dBFS (decibels full scale) may be considered loud incoming audio 413 in some embodiments. The level of the incoming audio can alternatively lead the incoming audio to be classified as quiet incoming audio 411 or normal incoming audio 412 in comparison to a low threshold (which in this example may be −45 dBFS). Other thresholds or a different quantity of thresholds may be used in some embodiments. In some embodiments, a spectrum 416 of the incoming audio is determined at step 415. A voice activity detector may be used in some embodiments at step 420 to classify incoming audio as being either voice audio 421 or non-voice audio 422. This voice/non-voice classification may be used in the controlling of the ANC and MIA components that is done is step 215 (FIG. 2). The determinations made at steps 410-420 may be made at rate of the analysis window described with reference to FIG. 2, or may be smoothed out over multiple analysis windows.

Figure 5:
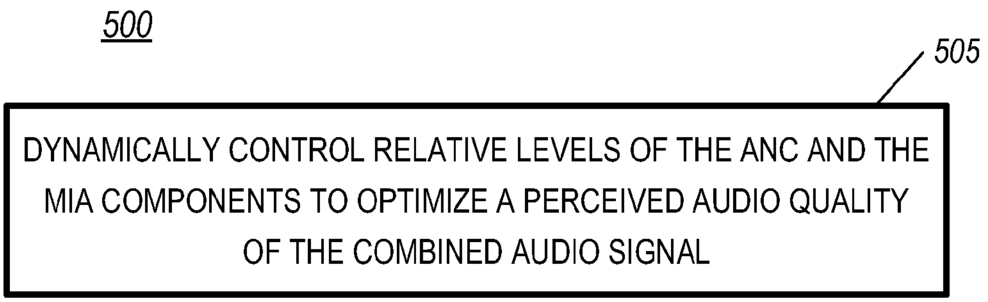
FIGS. 5-10 are flow charts that show additional steps of the method for background noise reduction related to the control of active noise cancellation and modified incoming audio components described with reference to FIG. 2, in accordance with some embodiments.

Referring to FIG. 5, a flow chart 500 shows an additional step of the method for background noise reduction, in accordance with some embodiments. The control of the ANC and MIA components in step 215 (FIG. 2) comprises determining a limit of the ANC component from the initial ANC component and a limit of the MIA component from the initial MIA component, as described above with reference to FIG. 2. Step 505 further comprises changing relative levels of the ANC and MIA components to optimize a perceived audio quality of the combined audio signal while remaining within the system limits while controlling the levels to be within the respective limits of the ANC and MIA components. In some embodiments this action may be done by changing the gain of the initial MIA component across the bandwidth of the initial MIA and changing the gain of the initial ANC component across the ANC spectrum. Alternatively, these actions may be done for selective frequency bands of the MIA component and/or the ANC component, in which case in different frequency bands the ratio may be different. An example of this is described with reference to FIGS. 9-12. Note that the MIA component and ANC components may have different bandwidths and that the bandwidth of the ANC component is not necessarily the bandwidth of the background noise spectrum, as will be explained below.

Figure 3:
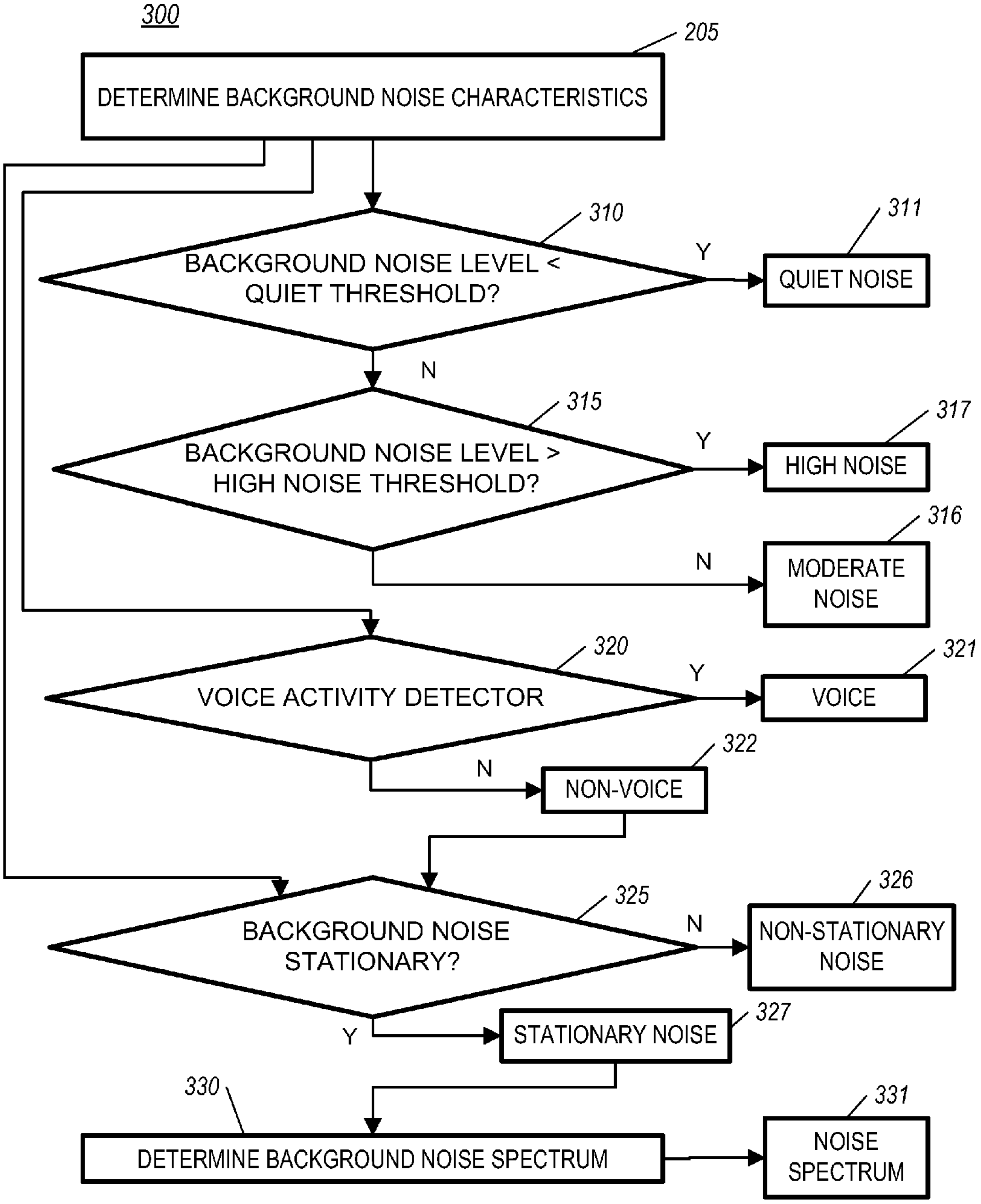
FIG. 3 is a flow chart that shows some additional steps of the method for background noise reduction related to background noise characteristics described with reference to FIG. 2, in accordance with some embodiments.

As noted with reference to FIG. 2, the classifications of the background noise and incoming audio performed with reference to FIG. 3 and FIG. 4 may be used to determine the ANC and MIA components. The summation of the ANC component with the MIA component is dynamically modified to optimize the perceived audio quality of the combined audio signal based on the analysis window rate. In the context of this document, "optimizing the perceived audio quality" of the combined audio signal comprises at least 1) maximizing the energy or intelligibility of the combined audio signal when the incoming audio is an audio signal that contains information that is not already completely known to the listener (or may be mostly unknown), such as a speech signal, or 2) maximizing the loudness, energy or perceived accuracy of audio that is known or mostly known to the listener, such as music. Examples of a speech signal may be speech from a caller, from an audible book, or from a TV. The methods described herein control modifications to the ANC and MIA components, in accordance with the type of audio and background noise being received, that are applied dynamically as the amplitudes and frequency characteristics of both the incoming audio and background noise change. Thus, some embodiments described are able to optimally handle changes in background noise and incoming audio, for example as a user's noise environment changes and/or the user changes the type of audio being listened to.

Figure 6:
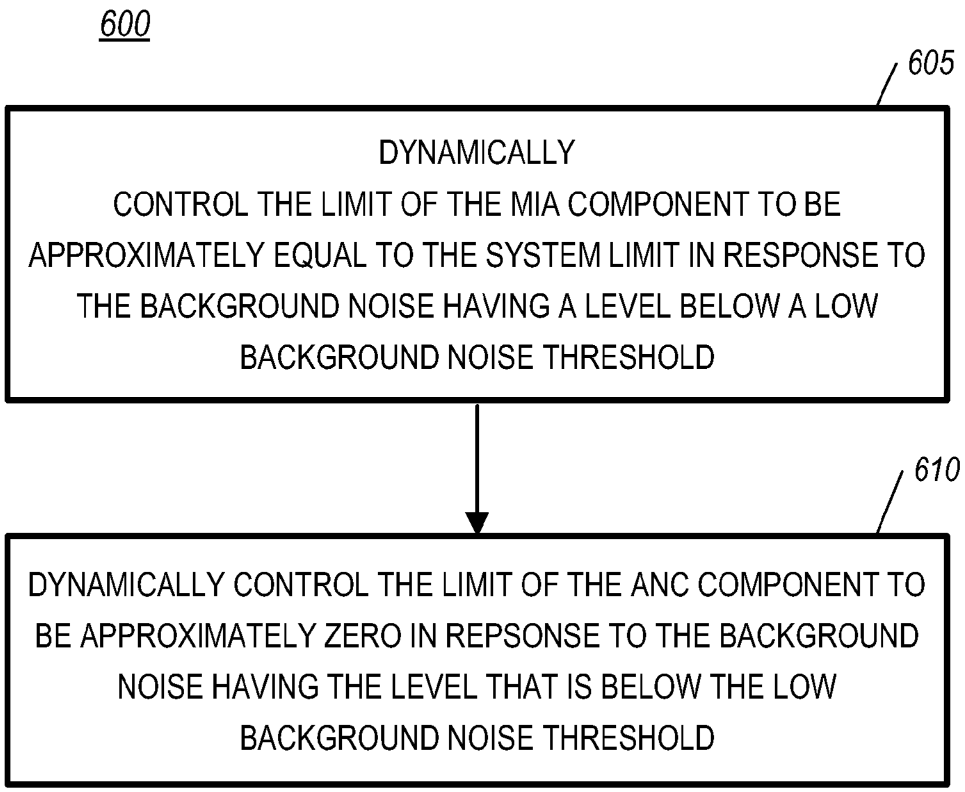

Referring to FIG. 6, a flow chart 600 shows some additional steps of the method for background noise reduction, in accordance with some embodiments. Steps 605 and 610 provide some detail of step 215 (FIG. 2). At step 605, the control of the ANC and MIA components comprises dynamically controlling the limit of the MIA component to be approximately equal to the system limit in response to the background noise having a level that is below a low background noise threshold. At optional step 610, the level of the ANC component may be controlled to be below a low ANC limit, or zero in some embodiments, in response to the background noise having the level that is below the low background noise threshold. For example, when the background noise is at or below 55 dBSPL the ANC component may be set to zero, and the MIA can be at the system level. Steps 605 and 610 are performed at a rate based on the analysis window rate.

Figure 7:
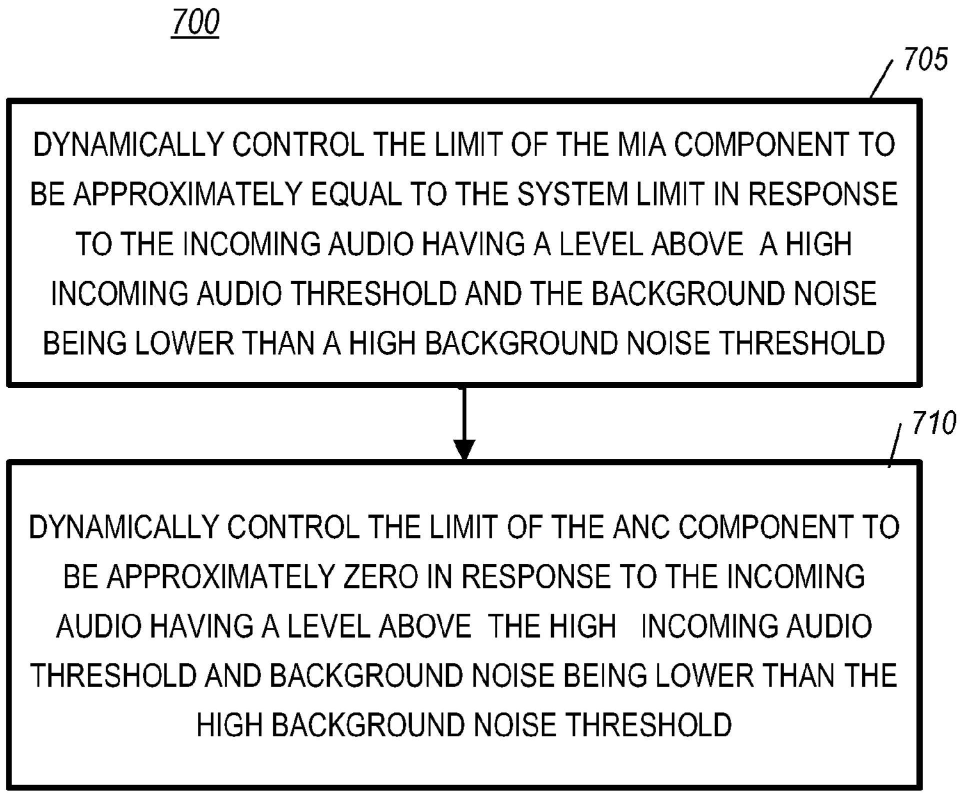

Referring to FIG. 7, a flow chart 700 shows some additional steps of the method for background noise reduction, in accordance with some embodiments. Steps 705-710 provide some detail of step 215 (FIG. 2). At step 705, the control of the ANC and MIA components comprises dynamically controlling the limit of the MIA component to be approximately at the system limit in response to the incoming audio having a level above a high incoming audio threshold and the background noise being lower than a high background noise threshold. At optional step 710, the limit of the ANC component may be controlled to be below a low threshold, or zero in some embodiments, in response to the incoming audio having the level above the high incoming audio threshold and the background noise being lower than the high background noise threshold For example, when the incoming audio has an average energy above −12 dBFS, and when the background noise is at and below 45 dBSPL, the ANC component may be set to zero, and the MIA limit can be controlled to be approximately at the system limit. In some embodiments, when the incoming audio has a signal to background noise ratio of over 20 dB, the level of the ANC component may be set to zero, allowing the MIA limit to be at the system limit.

By identifying the stationarity of the background noise, the ANC component can be adapted with respect to depth (the amount of cancellation; for example, 80%). That is, different signal limit allocations may be made between the MIA and ANC components depending on the stationarity of the background noise. This stems from the fact that the ANC efficacy can be higher when the background noise is stationary, in which case the ANC component can be allocated a higher energy level. When the incoming audio is speech and the background noise is stationary, an ANC component with high noise cancellation depth may result in the MIA component being at a limit that is not at the system limit, but which results in the combined signal being at the system limit and having an optimized perceived audio quality. When the background noise is non-stationary, the ANC component is less effective and the limit of the ANC is kept lower. The MIA component may then be allocated at a higher limit, with the combined signal being at the system limit and having an optimized perceived audio quality. The lower efficacy for non-stationary noise cancellation arises because the spectral characteristics of the non-stationary noise are changing fast and the adaptive filters used to generate the ANC component might not be able to converge at the same rate to reflect these changes in the environment. This becomes even more of a problem when a plurality of speakers are used to generate ANC partial acoustic components that are aimed and phased to combine into an optimized, noise cancelled acoustic signal (along with the MIA acoustic components) at a target area, or when there is a mismatch in the user's binaural hearing, such as when using a handset mobile device (in which case noise cancellation only occurs in one ear while the other ear simply hears the background noise). When the background noise is stationary, the noise spectrum can also be identified, to a single or multiple unique frequencies (periodic noises such as a clock ticking or a beeps or musical notes etc.), a predominant bandwidth (such as HVAC noises) or a combination of both. Many industrial applications involve removing specific noises, for example one application can be removing propeller induced noise in an aircraft cabin. These propeller noises are a combination of the tonal components of the fundamental and the harmonics of the blade frequency of the propeller. This propeller noise is stationary. The bandwidth of this noise can be identified to allocate the energy needed for the ANC component to those identified frequencies or the frequency bandwidth that includes the identified frequencies and allow an increased limit of the MIA component in the rest of the frequency bands. This can alternatively be stated as allowing for a change in the limit of the MIA component such that the summation of the ANC and the MIA components can be maximized when necessary to reach the system limit or achieve an optimized perceived audio quality in some embodiments, such as for speech. If the incoming audio is, for example, music, and the background noise is stationary, then the audio level of the combined audio signal may be controlled to a system limit that is determined by a user volume setting.

By identifying the background noise spectrum of stationary background noise, ANC component can be modified to have an optimal bandwidth that is equal to or less than the background noise bandwidth, and the incoming audio signal can be modified to maximize energy outside of this ANC spectrum. The energy allocation between the MIA component and the ANC component can be adapted for total maximum energy or peak within a full bandwidth applicable to a specific use case. In one example, the background noise spectrum is between 60 to 1300 Hz, so the ANC component is most efficient within that bandwidth. In these cases, the MIA component can be equalized such that its energy can be increased more in the rest of the incoming audio bandwidth such that total energy across all frequencies is maximized to the system limit. This frequency based maximization of energy can be done by analyzing the frequencies split into bins linearly, or on a logarithmic scale or critical bands or bark bands.

Active noise control is typically better suited for cancelling low frequency background noise. The physical spacing between the transducer and the target area at which silence is to be optimized, and the formation of the acoustic modes in this environment make it difficult for active noise control to be effective for the wavelengths of higher frequencies. For example, a mobile handset or a binaural headset application, this cancelation range can be 60-1300 Hz. Passive cancellation (e.g., foam, ear buds) is typically applied for frequencies above this bandwidth when applicable. The bandwidth of an application efficiency spectrum (the frequency range over which the ANC component can have high efficacy) can be application specific; it depends on design characteristics of the speakers (such as sensitivity, frequency response, seal to the ear in a headset application, maximum speaker excursion, number of speakers used to reproduce the ANC component acoustic signal and the target region where the cancelation is desired). For example, the loudspeaker designs used in mobile phones have high resonance frequency (around 500-800 Hz) and can result in a low sensitivity below 300 Hz and cannot reproduce these low frequencies. Meaning the loudspeaker may not be able to reproduce the full ANC component that is required to cancel a 50 Hz noise signal. The application efficiency spectrum for an application can be defined as the amplitude and frequency or multiple frequencies or a range of frequencies where the acoustic noise cancelation obtained by a test ANC signal meets the desired noise power level reduction (NPLR) for that application and/or where the noise power level boosting due to the test ANC signal is at a minimum (less than 10 dB). NPLR can vary from 5 to 30 dB across applications. The test ANC signal can be determined by allowing the ANC component to use the full system resources and limits with a goal to obtain the desired noise cancellation. This typically means removing or suspending the MIA during this process. This can be done via offline simulation or laboratory measurements during development of EAD 105 or via online calculations of EAD 105 or a combination of those techniques. Identifying the application efficiency spectrum, which has an application efficiency bandwidth in which the ANC component is most effective for a given application, allows the energy of the MIA component outside of that application efficiency bandwidth to be maximized for incoming audio such as voice. The background noise bandwidth in many cases exceeds the application efficiency bandwidth. However, limiting the ANC component to the application efficiency spectrum allows for an optimum perceived audio quality since the resulting acoustic noise cancellation has minimal distortion and uses a smaller portion of the system limit. The application efficiency bandwidth is typically an optimal bandwidth in those situations in which an application efficiency bandwidth determined, When the background noise is identified as stationary background noise and the background noise bandwidth has been identified, and the application efficiency bandwidth can be identified, the ANC component is obtained by adjusting the bandwidth of the initial ANC component to the bandwidth of the application efficiency bandwidth, when the background noise bandwidth exceeds the application efficiency bandwidth. This reduces the portion of the system limit used for the ANC component. The limit of the ANC component can have a value up to the maximum system limit. The MIA component can then be controlled to a limit that is up to the system limit minus the ANC component. Alternatively, an ANC upper limit that is less than or equal to the system limit can be set in applications where MIA component cannot be reduced to zero. The ANC upper limit is determined based on minimum signal level requirements for MIA and NPLR requirements for the ANC component. In one example, the background noise is high and the initial ANC component may require the full system limit to achieve the highest noise cancellation. In this example, by setting the ANC upper limit to be at 60% of system limit, the ANC component will be reduced but this technique allows for MIA to utilize the rest of the system limit. Note, the ANC component bandwidth can be can be less than or equal to the background noise bandwidth in a given instance. For non-stationary noises for which a background noise bandwidth cannot be identified, the ANC component bandwidth can be the same as the application efficiency bandwidth for that given application and the MIA component can be controlled to have a limit determined by subtracting the level of the ANC component from the system limit. In applications where MIA component cannot be reduced to zero, an ANC upper limit that is not equal to the system limit may be chosen. The reduced ANC upper limit is determined based on minimum signal level requirements for MIA and NPLR requirements for the ANC component. The reduced ANC upper limit may vary based on noise type (stationary vs non-stationary) or in some embodiments not depend on any background noise characteristics or analysis. In some embodiments, the ANC component and the ANC upper limit are determined without performing certain of the steps of background noise bandwidth characterization, as described above with reference to FIG. 4. For example, there might be a background noise of a known type at 60 Hz which when cancelled is known to optimize the perceived audio quality. This might be a user selection or for certain embodiments of the EAD 105 that are for specific applications. In this case, the ANC component may be allocated limits at the system limit within a known bandwidth and the MIA component allocated a limit determined by the system limit minus the ANC component over the rest of the system bandwidth.

As noted above, the ANC component may be determined independently from measuring background noise bandwidth for certain applications, by using the application efficiency bandwidth, which is known and stored for a application. In some embodiments the ANC component may be determined solely from the bandwidth of the background noise, such as when the background noise is analyzed to be stationary. In some embodiments, the ANC component may be determined based on a combination of characteristics of the background noise and the incoming audio and the application efficiency spectrum. Noise power level reduction is defined as the amount by which the noise power level is lowered, when the ANC component is used, with power levels measured at the error sensor.

A limit that the level of the ANC component may not exceed is dynamically determined. This limit is determined based on characteristics of the background noise and incoming audio and the desired noise power level reduction results of the application. The level of the ANC is controlled within this limit to achieve effective cancellation. The term "effective cancellation" means selecting a level of the ANC component that best cancels the background noise or selecting a level of the ANC component that is less than the level of the background noise, depending on the background noise characteristics and the incoming audio characteristics that meet the desired NPLR levels. The limit of the MIA component is determined. The limit is determined by subtracting the level of the ANC component from the system limit and using the resulting limit (which may be a peak voltage or a spectrum with a non-uniform amplitude) as the ANC component limit.

Figure 8:
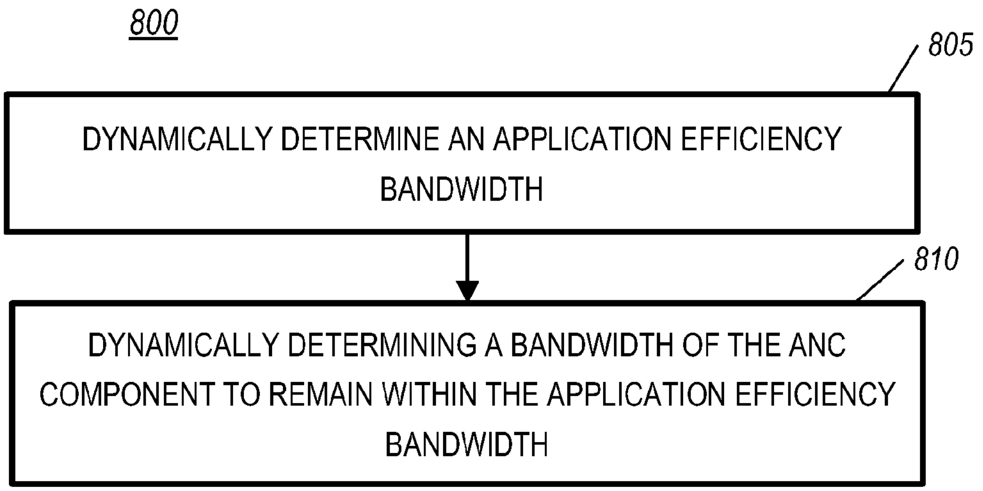

Referring to FIG. 8, a flow chart 800 shows some additional steps of the method for background noise reduction, in accordance with some embodiments. Steps 805-810 provide some detail of step 215 (FIG. 2). At step 805, an application efficiency bandwidth is dynamically determined, as described above. At step 810, the bandwidth of the ANC component is dynamically determined so that it remains within the application efficiency bandwidth. The ANC bandwidth may be dynamically controlled to be less than the application efficiency bandwidth when, for example, the background noise is determined to have a bandwidth less than the application efficiency bandwidth. This provides a bandwidth for the ANC component that optimizes the perceived audio quality of the combined audio signal.

Figure 9:
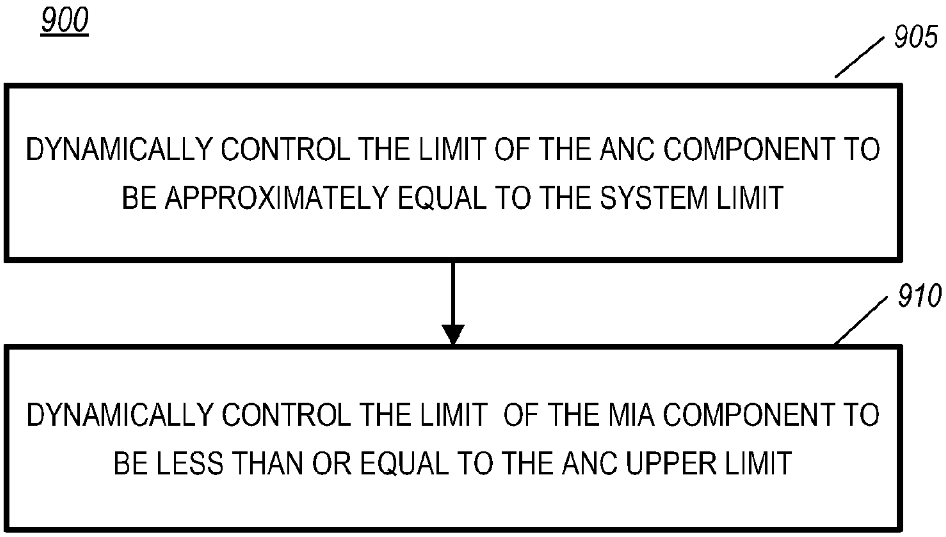

Referring to FIG. 9, a flow chart 900 shows some additional steps of the method for background noise reduction, in accordance with some embodiments. Steps 905-910 provide some detail of step 215 (FIG. 2). At step 905, the limit of the ANC component is dynamically controlled to be approximately equal to the system limit. At step 910, the limit of the MIA component is dynamically controlled to be less than or equal to the system limit minus the level of the ANC component.

Figure 10:
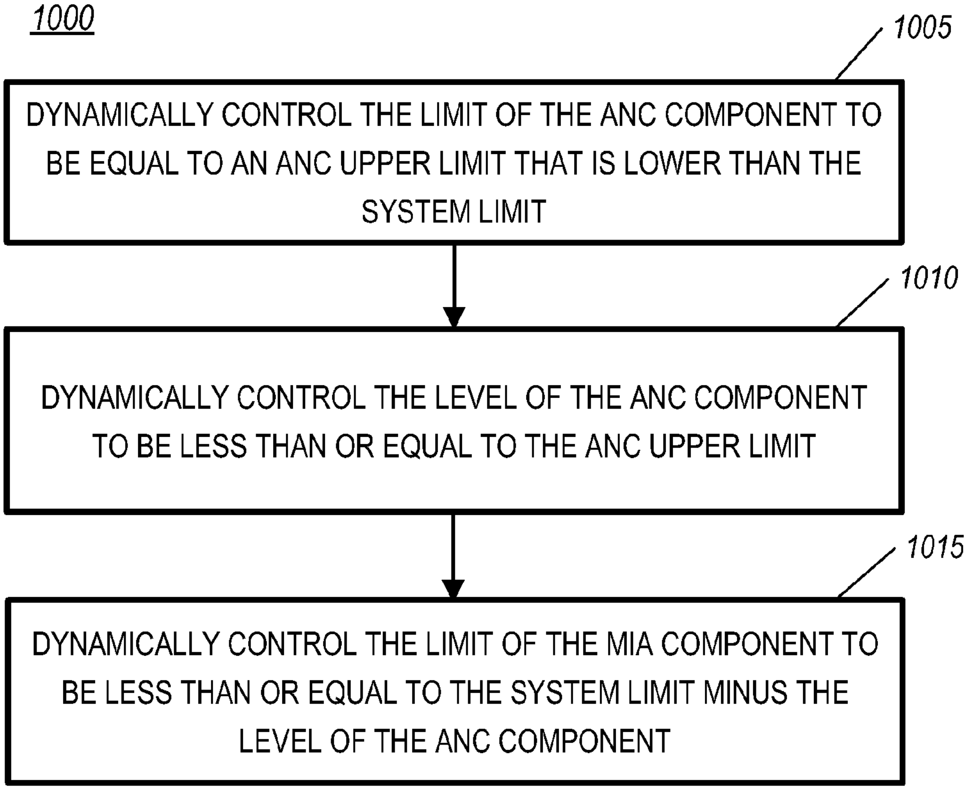

Referring to FIG. 10, a flow chart 1000 shows some additional steps of the method for background noise reduction, in accordance with some embodiments. Steps 1005-1015 provide some detail of step 215 (FIG. 2). At step 1005, the limit of the ANC component is controlled dynamically to be set to an ANC upper limit that is lower than the system limit. At step 1010, the level of the ANC component is dynamically controlled to be less than or equal to the ANC upper limit. At optional step 1015, the limit of the MIA component is dynamically controlled to be less than or equal to the system limit minus the level of the ANC component.

Referring to FIGS. 11-14, graphs 1100-1400 show bandwidths (in the form of spectral envelopes) of different audio signals that occur during a analysis window for a particular example of the method described above with reference to FIGS. 9-10. The vertical axis of each graph is logarithmic and has a maximum value of 0 dBFS, which in this example is the system limit for the energy of the combined signal for the time frame. The vertical axis has a minimum value of −50 dBFS. The spectrums are all plotted having amplitudes with reference to the system limit. The horizontal axis is a logarithmic axis of frequency, with a range from 10 Hz to 10 kHz.

Figure 11:
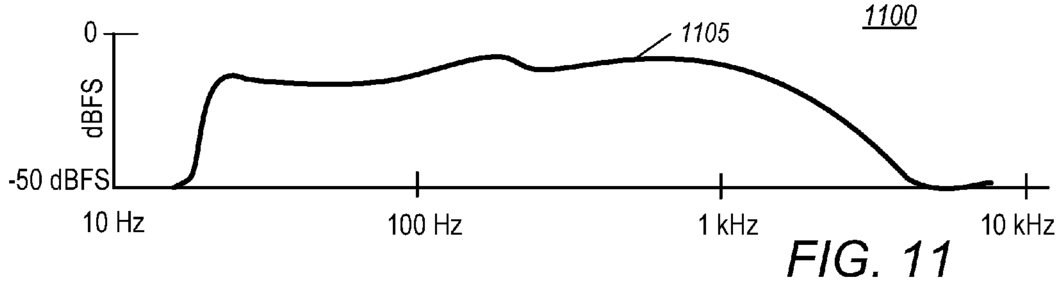
FIGS. 11-14 are graphs that show spectrums (in the form of spectral envelopes) of different audio signals that occur during a time frame for a particular example of the method described above with reference to FIG. 8.

Referring to FIG. 11, the graph 1100 shows an incoming audio spectrum 1105 that the EAD 105 obtains by the analyzing the incoming audio signal during the analysis window, in accordance with the particular example. This audio spectrum may be the same as the spectrum of the initial MIA component as described above. It will be appreciated that the energy during the time frame is less than the system limit.

Figure 12:
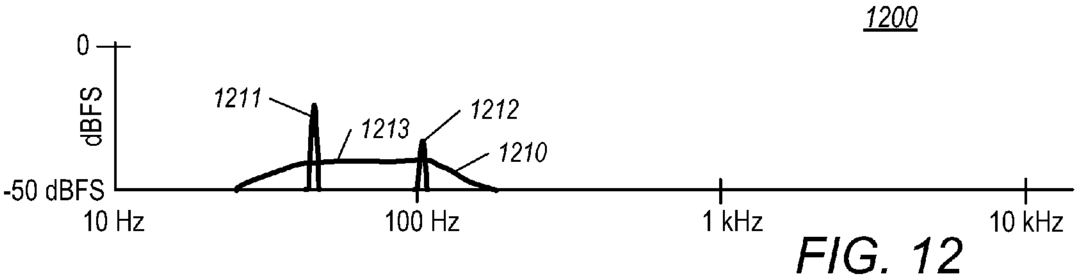

Referring to FIG. 12, the graph 1200 shows a background noise bandwidth 1210 that the EAD 105 determines by analyzing the background noise during the analysis window, in accordance with the particular example. It will be appreciated that the background noise has two prominent peak frequencies 1211, 1212 and some noise 1213.

Figure 13:
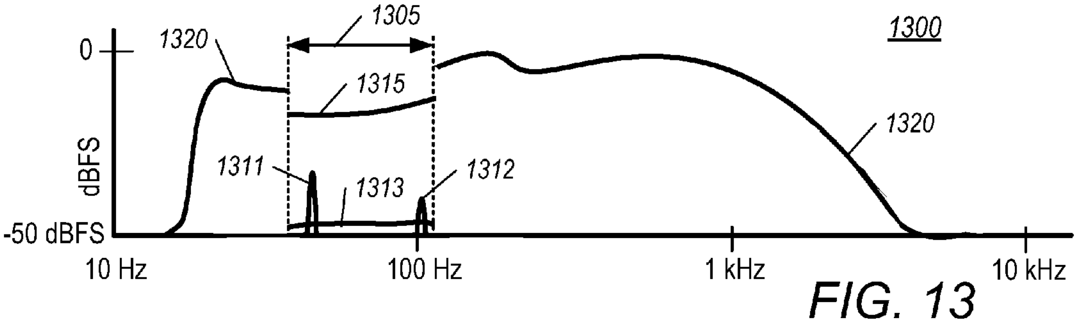

Referring to FIG. 13, the graph 1300 shows a bandwidth 1305 of an ANC component that the EAD 105 determines based on the characteristics of the incoming audio and the background noise, as described above. The spectral components 1311, 1312, 1313 of the ANC component are shown. The EAD 105 determines an optimal bandwidth for the ANC component within the application efficiency bandwidth. The EAD 105 generates the ANC component, comprising inverse phased frequency components 1311, 1312, and 1313 for the noise bandwidth. It can be seen that the ANC component 1311, 1312, and 1313 and the MIA component 1315, 1320 are both adjusted in level while their limits remain under the system limit.

Figure 14:
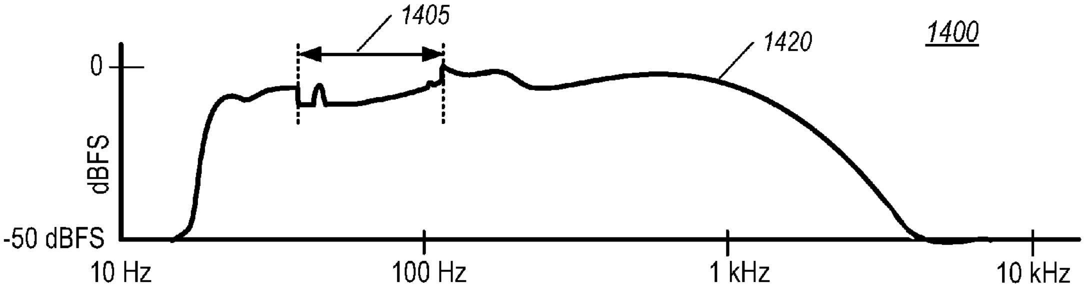

Referring to FIG. 14, the graph 1400 shows the spectrum of the combined audio signal 1420, with the reduced background noise frequency peaks within the ANC bandwidth 1405. The ANC component limit and the MIA component limit have each been increased within the system limit without the combined audio signal limit going over the system limit.

Figure 15:
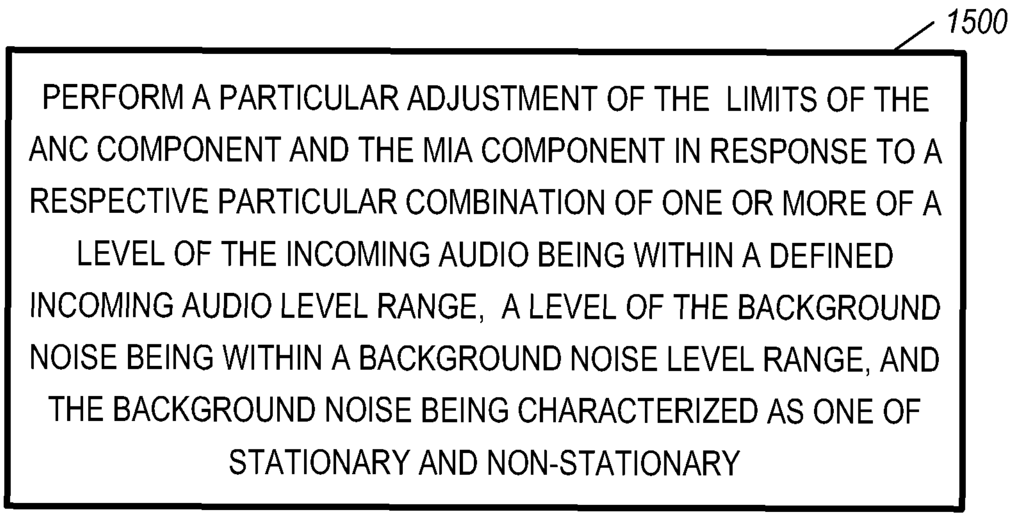
FIG. 15 is a flow chart that shows additional steps of the method for background noise reduction related to the control of the active noise cancellation and modified incoming audio components described with reference to FIG. 2, in accordance with some embodiments.

Referring to FIG. 15, a flow chart 1500 shows an additional step of the method for background noise reduction, in accordance with some embodiments. At step 1505, particular adjustments of the levels of the ANC and MIA components that are performed under dynamic control may be performed in response to a respective particular combination of one or more of a level of the incoming audio being within a defined incoming audio range, a level of the background noise being within a defined background noise range, and the background noise being one of stationary and non-stationary. The steps described with reference to FIGS. 9-10 are performed in response to different particular combinations of characteristics that are cited in step 1505. FIG. 7 is one example of a method described with reference to FIG. 15.

Figure 16:
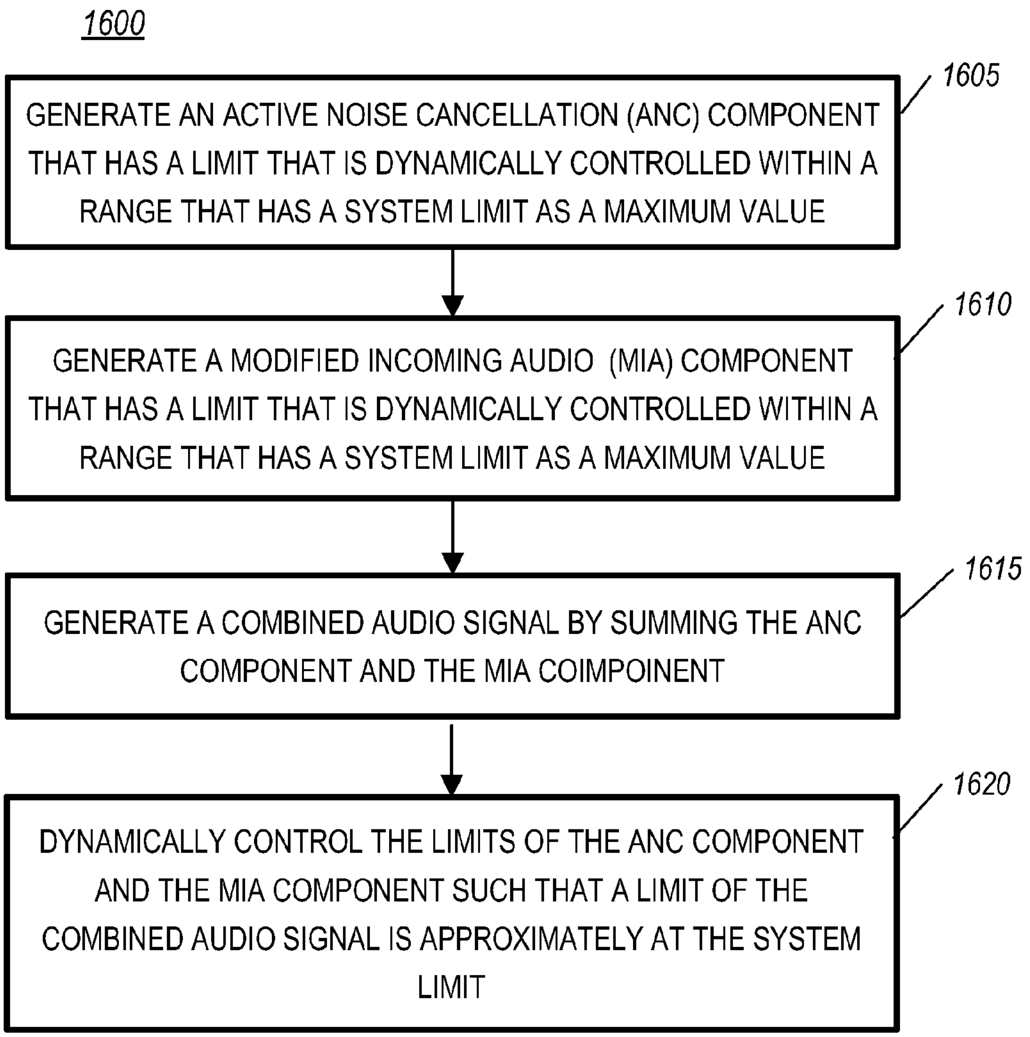
FIG. 16 is a flow chart that shows some steps of a method for background noise reduction, in accordance with some embodiments.

Referring to FIG. 16, a flow chart 1600 shows some steps of a method for background noise reduction, in accordance with some embodiments. At step 1605, an active noise cancellation (ANC) component is generated that has a limit that is dynamically controlled within a range that has a system limit as a maximum value. At step 1610, a modified incoming audio (MIA) component is generated that has a limit that is dynamically controlled within a range that has a system limit as a maximum value. At step 1615, a combined audio signal is generated by summing the ANC component and the MIA component. At step 1620, the limits of the ANC component and the MIA component are dynamically controlled to maintain a limit of the combined audio signal to be approximately at the system limit in some embodiments, and less than or at the system level in some embodiments. Ranges of the levels for the ANC component and the MIA component have a lower value that is approximately zero. In some embodiments, "approximately zero" means an analog value of zero and a digital value of −90 dBFS. "Approximately at the system limit" has the same meaning as described above with reference to FIG. 2.

It will be appreciated that embodiments of this method generate a combined audio signal that has a limit that is approximately at the system limit, including situations in which the ANC is at a very low level due to low background noise energy. The embodiments described herein provide an optimized perceived audio quality that is unique in comparison to systems in which the limits of the ANC and/or MIA components of the combined audio signal are fixedly constrained so that the sum of the limits is equal to or less than the system limit, resulting in a limit of the combined audio signal that is constrained to be less than the system limit when either of the components is less than the component limit. For example, a situation can occur in some of these fixedly constrained systems, when the background noise level is below a ANC component constraint limit and the MIA component cannot be increased above its constraint limit.

Figure 17:
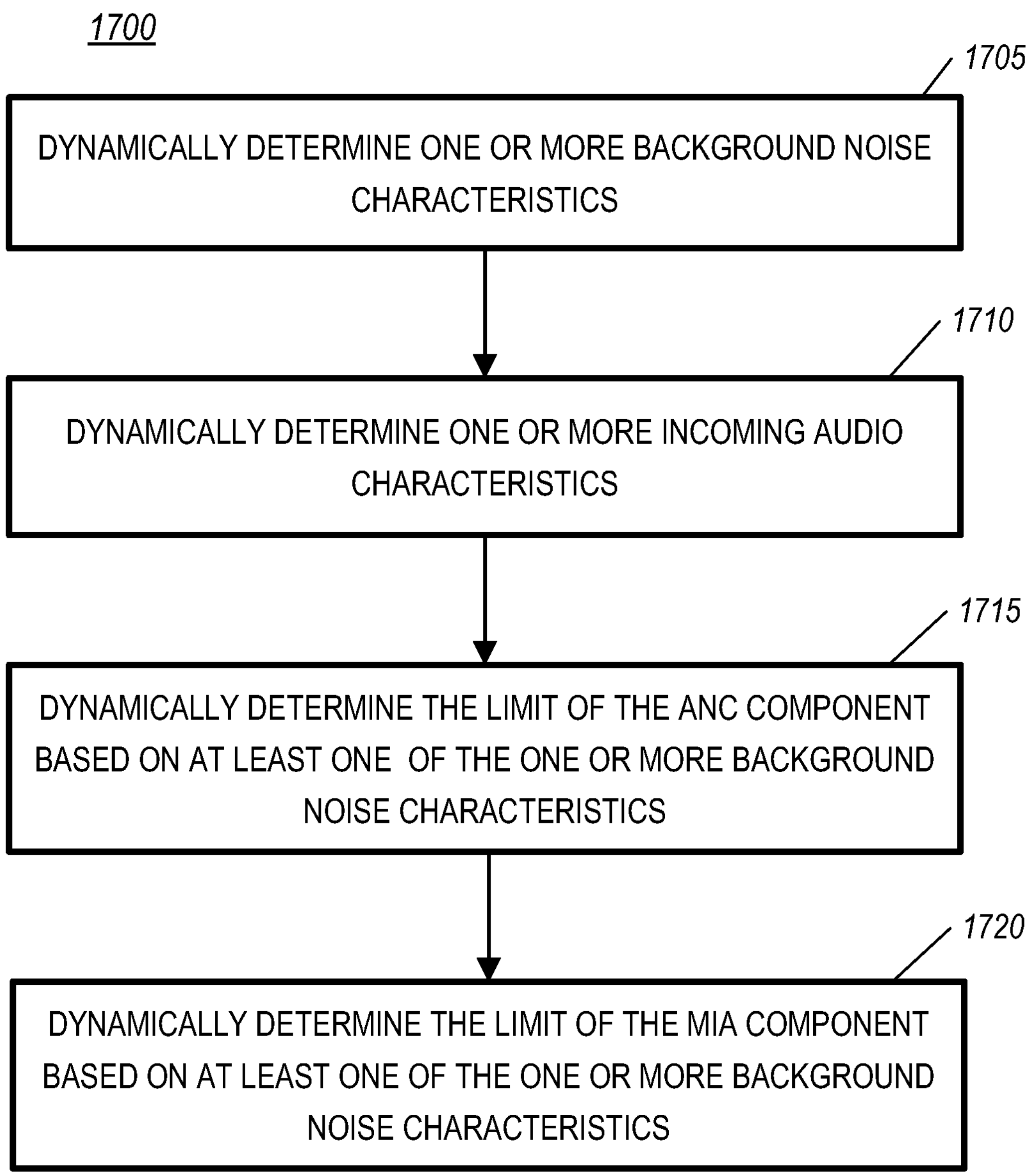
FIG. 17 is a flow chart that shows some additional steps of the method for background noise reduction described with reference to FIG. 14, in accordance with some embodiments.

Referring to FIG. 17 a flow chart 1700 shows some additional steps of the method for background noise reduction, in accordance with some embodiments. Steps 1705-1720 provide some detail of steps 1605-1610 (FIG. 16). At step 1705, one or more background noise characteristics are determined. The determination of at least some of these background noise characteristics are described above with reference to FIG. 3. At step 1710, one or more incoming audio characteristics are determined. The determination of at least some of these incoming audio characteristics is described above with reference to FIG. 4. At step 1715, the limit of the ANC component is determined based on at least one of the one or more background characteristics. At step 1720, the limit of the MIA component is determined based on at least one of the one or more background noise characteristics. The determinations made in steps 1715 and 1720 have been described with more detail with reference to FIG. 2, FIGS. 5-10, and FIG. 15 above.

It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems. It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "coupled" as used herein is defined as connected, although not necessarily directly and not necessarily mechanically.

Reference throughout this document are made to "one embodiment", "some embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The processes illustrated in this document, for example (but not limited to) the method steps described in FIGS. 2-10, 15-17, may be performed using programmed instructions contained on a computer readable medium which may be read by a processor of a CPU. A computer readable medium may be any tangible medium capable of storing instructions to be performed by a microprocessor. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for background noise reduction, comprising:

determining one or more background noise characteristics;

determining one or more incoming audio characteristics; and generating a combined audio signal comprising an active noise cancellation (ANC) component that is determined based on at least one of the one or more background noise characteristics and a modified incoming audio (MIA) component that is determined based on at least one of the one or more background noise characteristics, wherein each of a limit of the ANC component and a limit of the MIA component is dynamically controlled to be less than or equal to a system limit, wherein a limit of the combined signal is approximately at the system limit.

2. The method according to claim 1, wherein dynamically controlling the limits of the MIA component and the ANC component further comprises:

dynamically changing relative levels of the MIA and ANC components to optimize a perceived audio quality of the combined audio signal.

3. The method according to claim 1, wherein a level of the ANC component and a level of the MIA component are dynamically controlled wherein the limit of the combined signal is approximately equal to the system limit.

4. The method according to claim 1, further comprising: controlling dynamically the limit of the MIA component to be approximately equal to the system limit in response to the background noise having a level that is below a low background noise threshold.

5. The method according to claim 4, further comprising: controlling dynamically the limit of the ANC component to be approximately zero in response to the background noise having the level that is below the low background noise threshold.

6. The method according to claim 1, further comprising: controlling dynamically the limit of the MIA component to be approximately equal to the system limit in response to the incoming audio having a level that is above a high incoming audio threshold and the background noise level being lower than a high background noise threshold.

7. The method according to claim 6, further comprising: controlling dynamically the limit of the ANC component to be approximately zero in response to the incoming audio having the level that is above the high incoming audio threshold and the background noise level being lower than the high background noise threshold.

8. The method according to claim 1, wherein dynamically controlling the limit of the ANC component comprises:

controlling dynamically the limit of the ANC component to be approximately equal to the system limit; and controlling dynamically the limit of the MIA component to be less than or equal to the system limit minus a level of the ANC component.

9. The method according to claim 1, wherein dynamically controlling the limit of the ANC component comprises:

setting an ANC upper limit that is lower than the system limit; and controlling dynamically a level of the ANC component to be less than or equal to the ANC upper limit.

10. The method according to claim 9, wherein dynamically controlling the limit of the MIA component comprises:

controlling dynamically the limit of the MIA component to be less than or equal to the system limit minus the level of the ANC component.

11. The method according to claim 1, wherein dynamically controlling the ANC component comprises:

determining dynamically an application efficiency bandwidth; and controlling dynamically a bandwidth of the ANC component to remain within the application efficiency bandwidth.

12. The method according to claim 1, wherein dynamically controlling the limits of the ANC component and MIA component comprises making a particular adjustment of the limits of the ANC and MIA components in response to a respective particular combination of one or more of a level of the incoming audio being within a defined incoming audio level range, a level of the background noise being within a defined background noise level range, and the background noise being characterized as one of stationary and non-stationary.

13. An apparatus, comprising:

a microphone that senses background noise;

an audio source that provides incoming audio;

a speaker that generates audio from a combined audio signal; a memory that stores program instructions; and a processor that executes the program instructions to determine one or more background noise characteristics, determine one or more incoming audio characteristics, and generate the combined audio signal comprising an active noise cancellation (ANC) component that is determined based on at least one of the one or more background noise characteristics and a modified incoming audio (MIA) component that is determined based on at least one of the one or more background noise characteristics, wherein each of a limit of the ANC component and a limit of the MIA component is dynamically controlled to be less than or equal to a system limit, wherein a limit of the combined signal is approximately at the system limit.

14. A non-transitory media comprising programmed instructions that when executed by a processor performs:

determining one or more background noise characteristics;

determining one or more incoming audio characteristics; and generating a combined audio signal comprising an active noise cancellation (ANC) component that is determined based on at least one of the one or more background noise characteristics and a modified incoming audio (MIA) component that is determined based on at least one of the one or more background noise characteristics, wherein each of a limit of the ANC component and a limit of the MIA component is dynamically controlled to be less than or equal to a system limit, wherein a limit of the combined signal is approximately at the system limit.

* * * * *